United States Patent
Blain et al.

(10) Patent No.: US 6,770,161 B2
(45) Date of Patent: Aug. 3, 2004

(54) METHOD OF MAKING THERMAL INSULATING DEVICE BY WINDING

(75) Inventors: David Paul Blain, Rocky River, OH (US); Robert Angelo Mercuri, Seven Hills, OH (US)

(73) Assignee: Advanced Energy Technology Inc., Wilimington, DE (US)

( * ) Notice: Subject to any disclaimer, the term of this patent is extended or adjusted under 35 U.S.C. 154(b) by 307 days.

(21) Appl. No.: 10/104,290

(22) Filed: Mar. 22, 2002

(65) Prior Publication Data

US 2002/0124932 A1 Sep. 12, 2002

Related U.S. Application Data

(62) Division of application No. 09/684,952, filed on Oct. 10, 2000, now Pat. No. 6,413,601, which is a continuation of application No. 09/178,134, filed on Oct. 23, 1998, now abandoned.

(51) Int. Cl.[7] .............................................. B32B 31/00
(52) U.S. Cl. ...................... 156/184; 156/155; 156/191; 156/307.3; 156/307.7
(58) Field of Search ................................ 156/184, 191, 156/155, 307.3, 307.7

(56) References Cited

U.S. PATENT DOCUMENTS

| | | | |
|---|---|---|---|
| 3,009,600 A | 11/1961 | Matsch | 220/9 |
| 3,404,061 A | 10/1968 | Shane et al. | 161/125 |
| 3,494,382 A | * 2/1970 | Shane et al. | 138/129 |
| 4,279,952 A | 7/1981 | Kodama et al. | 428/36 |
| 4,620,839 A | * 11/1986 | Moritoki et al. | 425/405 H |
| 4,888,242 A | 12/1989 | Matsuo et al. | 428/408 |
| 4,895,713 A | 1/1990 | Greinke et al. | 423/448 |
| 4,971,772 A | * 11/1990 | Aulich et al. | 422/241 |
| 5,082,335 A | * 1/1992 | Cur et al. | 312/401 |
| 5,126,112 A | * 6/1992 | Burgie | 422/241 |
| 5,198,063 A | * 3/1993 | Howard et al. | 156/282 |
| 5,540,996 A | 7/1996 | Tanzilli et al. | 428/408 |
| 5,582,781 A | * 12/1996 | Hayward | 264/28 |
| 5,800,924 A | 9/1998 | Metter | 428/408 |

* cited by examiner

Primary Examiner—Jeff H. Aftergut
(74) Attorney, Agent, or Firm—Waddey & Patterson; James R. Cartiglia

(57) ABSTRACT

A thermal insulating device, and process for making it, are presented. The inventive thermal insulating device is formed of a cylindrically shaped shell comprising multiple layers of a continuous spiral wound anisotropic flexible graphite sheet, the layers of spiral wound graphite sheet being separated by and bonded to a cured resin.

3 Claims, 3 Drawing Sheets

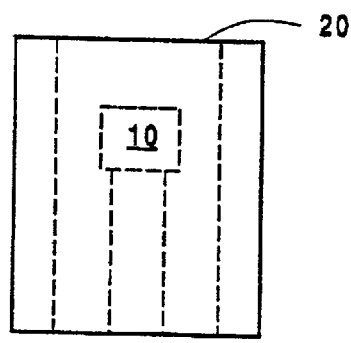
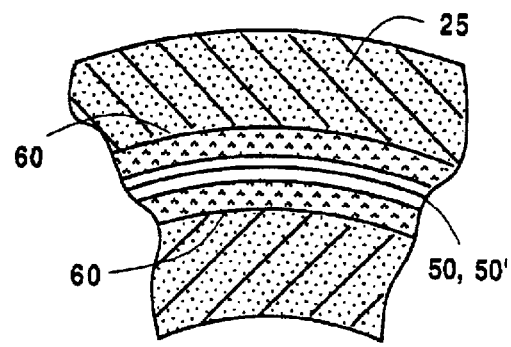
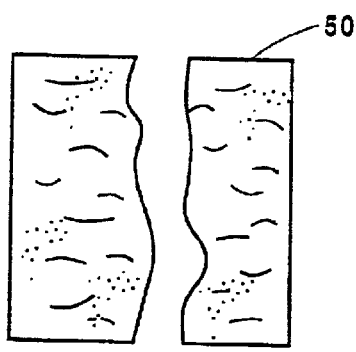
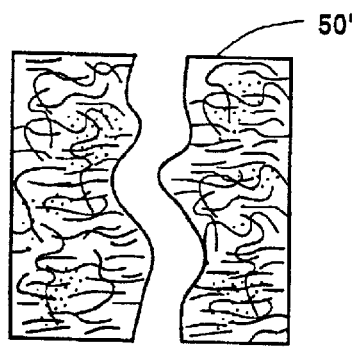
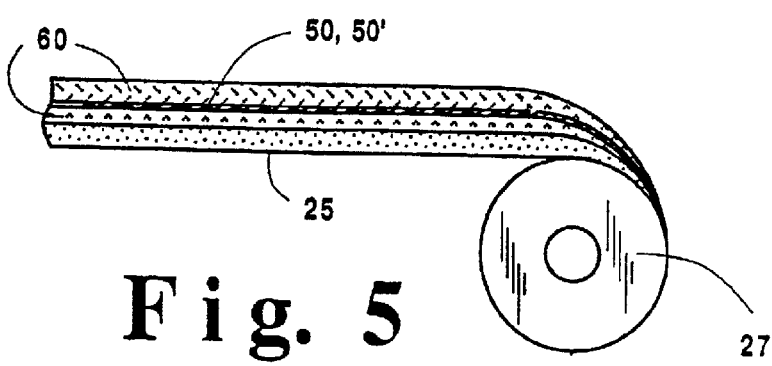

METHOD OF MAKING THERMAL INSULATING DEVICE BY WINDING

The application is a divisional of Ser. No. 09/684,952 filed Oct. 10, 2000, now U.S. Pat. No. 6,413,601 which was a continuation of Ser. No. 09/178,134 filed Oct. 23, 1998, now abandoned.

FIELD OF THE INVENTION

The present invention relates to a thermal insulating device. More particularly, the present invention relates to a thermal insulating device useful for a high temperature reactor, such as a reactor that utilizes highly reactive chemical gases, such as inorganic halides, especially chlorine and fluorine, in a non-oxidizing atmosphere. The inventive thermal insulating device includes a shell comprising resin bonded spiral wound continuous flexible graphite sheet.

BACKGROUND OF THE INVENTION

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation.

Graphites possess anisotropic structures and thus exhibit or possess many properties that are highly oriented, i.e. directional. Graphites may be characterized as laminated structures of carbon, that is, structures consisting of superposed layers or laminae of carbon atoms joined together by weak van der Waals forces. In considering the graphite structure, two axes or directions are usually noted, i.e. the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. Natural graphites possess a high degree of orientation and hence anisotropy with respect to thermal and electrical conductivity and other properties.

As noted above, the bonding forces holding the parallel layers of carbon atoms together are only weak van der Waals forces. Graphites can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character is substantially retained.

Graphite flake which has been greatly expanded and more particularly expanded so as to have a final thickness or "c" direction dimension which is up to about 80 or more times the original "c" direction dimension can be formed without the use of a binder into cohesive or integrated sheets, e.g. webs, papers, strips, tapes, or the like. The formation of graphite particles which have been expanded to have a final thickness or "c" dimension which is up to about 80 or more times the original "c" direction dimension into integrated sheets without the use of any binding material is believed to be possible due to the excellent mechanical interlocking, or cohesion which is achieved between the voluminously expanded graphite particles.

In addition to flexibility, the sheet material, as noted above, has also been found to possess a high degree of thermal anisotropy. Sheet material can be produced which has excellent flexibility, good strength and is highly resistant to chemical attack and has a high degree of orientation.

Briefly, the process of producing flexible, binderless graphite sheet material comprises compressing or compacting under a predetermined load and in the absence of a binder, expanded graphite particles which have a "c" direction dimension which is up to about 80 or more times that of the original particles so as to form a substantially flat, flexible, integrated graphite sheet. Once compressed, the expanded graphite particles, which generally are worm-like or vermiform in appearance, will maintain the compression set. The density and thickness of the sheet material can be varied by controlling the degree of compression. The density of the sheet material can be within the range of from about 0.08 g/cm$^3$ to about 2.0 g/cm$^3$. The flexible graphite sheet material exhibits an appreciable degree of anisotropy, with the degree of anisotropy increasing upon roll pressing of the sheet material to increased density. In roll pressed anisotropic sheet material, the thickness, i.e. the direction perpendicular to the sheet surface comprises the "c" direction and the directions ranging along the length and width, i.e. along or parallel to the surfaces comprises the "a" directions.

SUMMARY OF THE INVENTION

The present invention comprises a shell, preferably a self-supporting, cylindrically shaped shell, having two ends (denoted for the sake of convenience as "top" and "bottom" useful, for instance, for surrounding a high temperature radiant heat source, such as a reactor in which highly chemically active gases are contained. The shell can be used as a heat shield to reflect radiant heat energy back to the reactor and to minimize loss of thermal energy due to conduction. The aforementioned shell comprises multiple layers formed from a continuous spiral wound sheet of anisotropic flexible graphite, bonded with a cured resin. The resin is coated on both sides of a thin sheet of heat decomposable carbon based material that during the fabrication process is co-extensive with the spiral wound sheet of flexible graphite and is cured in situ. The thin sheet of heat decomposable carbon based material provides a path for the escape of gases which develop in the course of in situ curing of the resin; this path, resulting from the aforesaid decomposition, is provided between the layers of the sheet of carbon-based material and spiral wound flexible graphite and further enables contact between resin applied on both, i.e. the opposite, sides of the sheet of heat decomposable carbon-based material in the course of in situ curing of the resin. This results in a strong continuous bonding layer of resin between, and co-extensive with, the spiral wound sheet of flexible graphite.

In a further embodiment of the present invention, a second shell essentially identical to the first shell, except for being larger in cross-section, is provided. The second shell is positioned to surround the first shell so as to define an annular chamber therebetween, the annular chamber also having two ends (also conveniently denoted "top" and "bottom") therebetween. Uncompressed particles of expanded graphite can be provided in the annular chamber as an insulating material, preferably so as to essentially fill the annular chamber. Other insulating materials that can be employed include carbon felt, graphite felt, rigid insulation, ceramic wool fibers, and even gases like argon or air. Indeed, insulation can also be provided by drawing a vacuum in the annular chamber.

The annular chamber can be closed, at one or both of its ends, by one or more flexible sheets of graphite that are advantageously resin-bonded to one or both of the first and second shells. Preferably, the covering flexible sheets of graphite are themselves multi-layered, with the individual layers bonded to resin, in the same manner as the shell is formed. As was the case with the inventive shell, the resin is coated on both sides of a thin sheet of heat decomposable carbon based material that during the fabrication process is co-extensive with the sheet of flexible graphite and is cured in situ. The thin sheet of heat decomposable carbon based material provides a path for the escape of gases which develop in the course of in situ curing of the resin; this path, resulting from the aforesaid decomposition, is provided between the layers of the flexible graphite and further enables contact between resin applied on both, i.e. the opposite, sides of the sheet of heat decomposable carbon-based material in the course of in situ curing of the resin. This results in a strong continuous bonding layer of resin between, and co-extensive with, the sheet of flexible graphite. Thus, in situ curing of the resin to bond the layers of flexible graphite sheet for the cover, and decompose the thin sheet of heat decomposable carbon based material is also preferred.

BRIEF DESCRIPTION OF THE DRAWINGS

FIG. 2 is a side elevation view of the heat shield of FIG. 1;

FIG. 3 and FIG. 4 show sheets of heat decomposable carbon-based material for use in the present invention;

FIG. 5 shows, schematically, the forming of a heat shield in accordance with the present invention;

FIG. 6 shows a fragmentary cross-section of a heat shield of this invention prior to cooling.

DETAILED DESCRIPTION OF THE INVENTION

Figure 1:
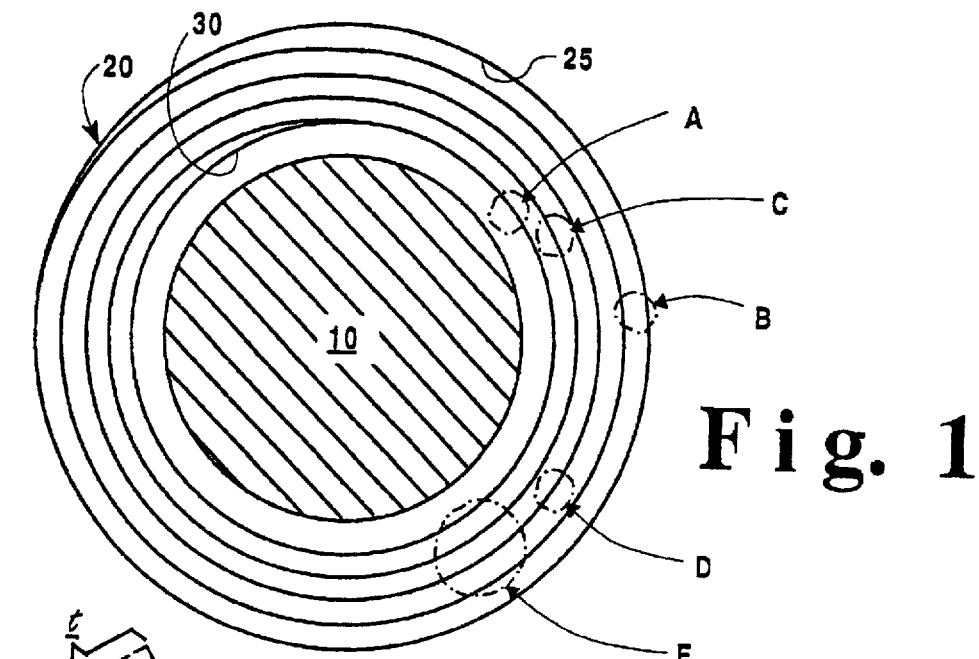
FIG. 1 is a top plan view of a heat shield in accordance with the present invention.

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite decomposes and volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials suitable for use in the present invention include highly graphitic carbonaceous materials capable of reversibly intercalating alkali metals. These highly graphitic carbonaceous materials have a degree of graphitization above about 0.80 and most preferably about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous anode materials include synthetic graphites and natural graphites from various sources, as well as other carbonaceous materials such as petroleum cokes heat treated at temperatures above 2500° C., carbons prepared by chemical vapor deposition or pyrolysis of hydrocarbons and the like.

The graphite starting materials used in the present invention may contain non-carbon components so long as the crystal structure of the starting materials maintains the required degree of graphitization. Generally, any carbon-containing material, the crystal structure of which possesses the required degree of graphitization, is suitable for use with the present invention. Such graphite preferably has an ash content of less than six weight percent.

A common method for manufacturing graphite sheet or foil is described by Shane et al. in U.S. Pat. No. 3,404,061, the disclosure of which is incorporated herein by reference. In the typical practice of the Shane et al. method, graphite flakes are intercalated by dispersing the flakes in a solution containing an oxidizing agent such as a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid.

The preferred intercalating agent is a solution of a mixture of sulfuric acid, or sulfuric acid and phosphoric acid, and an oxidizing agent, i.e., nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes. The quantity of intercalation solution retained on the flakes after draining may range from about 20 to 150 parts of solution by weight per 100 parts by weight of graphite flakes (pph) and more typically about 50 to 120 pph. Alternatively, the quantity of the intercalation solution may be limited to between about 10 to 50 parts of solution per hundred parts of graphite by weight (pph) which permits the washing step to be eliminated as taught and described in U.S. Pat. No. 4,895,713, the disclosure of which is also incorporated herein by reference. The intercalated graphite flakes are exfoliated by exposing them to an energy source, such as a heat source like a flame, or energy provided by infrared, microwave or radiofrequency radiation. In the case of a flame, the intercalated graphite flakes are advantageously exposed for only a few seconds, preferably at a temperature greater than about 700° C., more typically about 1000° C. or higher.

The exfoliated graphite particles, or worms, are then compressed and subsequently roll pressed into a densely compressed flexible graphite sheet of desired density and thickness and substantially increased anisotropy with respect to thermal conductivity and other physical properties. Suitable exfoliation methods and methods for compressing the exfoliated graphite particles into thin foils are disclosed in the aforementioned U.S. Pat. No. 3,404,061 to Shane et al. It is conventional to compress the exfoliated worms in stages with the product of the first or early stages of compression referred to in the art as "flexible graphite mat." The flexible graphite mat is then further compressed by roll pressing into a standard density sheet or foil of preselected thickness. A flexible graphite mat may be thus compressed by roll pressing into a thin sheet or foil of between about 0.05 to 1.75 mm in thickness with a density approaching theoretical density, although a density of about 1.1 g/cm$^3$ is acceptable for most applications.

Roll pressed flexible graphite sheet is known to be a relatively good thermal barrier in the direction ("c" axis) perpendicular to the parallel planar surfaces of the sheet. The thermal conductivity along and parallel to the sheet surfaces ("a" axes) is approximately twenty (20) or more times greater than through its thickness ("c" axis).

Figure 1A:
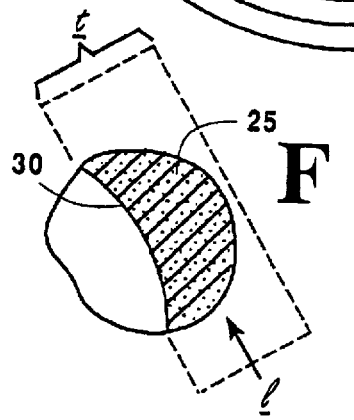
FIGS. 1(A) to 1(E) show enlarged portions of FIG. 1.

With reference to FIG. 1, which is a top plan view, and the side elevation view of FIG. 2, in a preferred embodiment, a high temperature reactor is indicated schematically at 10, representing, for example, a reactor which involves the use of inorganic halides in a non-oxidizing atmosphere and which operates at temperatures of about 1000° C. and higher. A heat shielding self-supporting shell is shown at 20. As shown in FIG. 1, the self-supporting shell 20 comprises an anisotropic, continuous spiral wound sheet 25 of graphite. The spiral of flexible graphite sheet 25 is suitably from about 1 to 100 mm thick and the density of the sheet 25 is suitably from 0.8 to 1.45 g/cm$^3$. With reference to FIG. 1(A), the transfer of thermal energy through the thickness "t" of the anisotropic flexible graphite sheet 25 (the "c" axis direction) is less than in the plane "l" of the flexible graphite sheet 25 (the "a" axes directions). Thus, most of the heat energy radiated from high temperatures heat source reactor 10 (about 1000° C. and higher) is reflected back to the reactor 10 from the inner surface 30 of shell 20, which is formed of anisotropic flexible graphite sheet. Some of the radiant heat energy from reactor 10 is not reflected back and causes the temperature at locations on the inner surface 30 of shell 20 to rise. Heat at these locations is rapidly transferred and spread by conduction throughout the anisotropic flexible graphite sheet 25 in all directions ("l" of the "a" axes in the plane of flexible graphite sheet 25. Thus, the temperature throughout sheet 25 is essentially uniform and the presence of persistent hot spots is avoided.

Figure 1B:
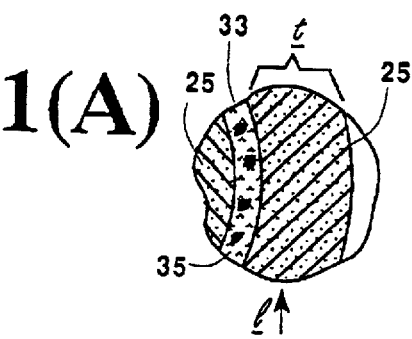

In order to provide the spiral wound sheet with sufficient strength to be self-supporting in rugged high temperature environments, a thin layer of cured resin, advantageously an in situ cured phenolic resin, indicated at 33 in FIG. 1, co-extensive with the spiral wound sheet of flexible graphite, is used to bond the spiral wound sheets. Dispersed within this in situ cured resin are typically small particles 35 of carbon, shown in FIG. 1(B) resulting from the charring of a heat decomposable resin supporting substrate during curing of the resin.

Figure 1C:
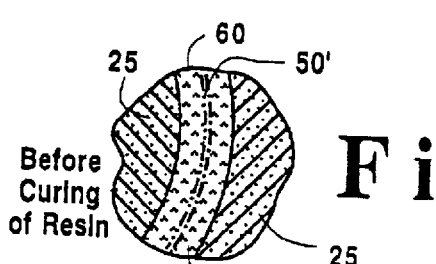
Figure 1D:
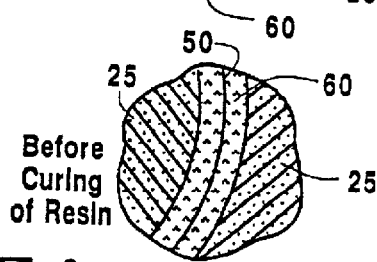
Figure 1E:
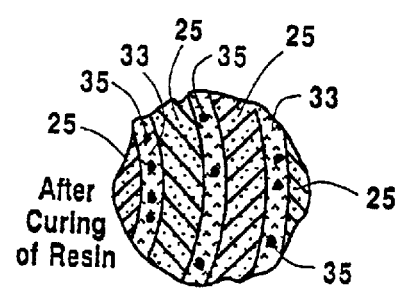

With reference to FIGS. 1(C), 1(D), a thin sheet of heat decomposable carbon based material or substrate, such as kraft paper as shown at 50 in FIG. 3, or preferably carbon fiber tissue as shown at 50' in FIG. 4, is spiral wound with the anisotropic flexible graphite sheet 25 on mandrel 27 as shown in FIG. 5. The thin, heat decomposable carbon based sheet 50, 50', co-extensive with flexible graphite sheet 25, is impregnated with and coated on both sides with liquid resin 60 as shown in FIG. 6. Generally, the resin is coated on each side of sheet 50, 50' to a thickness that can vary between about 5 mm and about 75 mm. The spiral wound article, before curing of the resin, is shown in FIG. 6. Curing of the resin 60 is accomplished by heating the spiral wound article 20 at 125° C. for 16 minutes and 300° C. for 16 hours. In the course of curing, the carbon base heat decomposable sheet 50, 50' is gradually reduced to particles of carbon char (35 in FIGS. 1(B), 1(E)) while the gases which evolve from the curing of the resin 60, and the charring of carbon-based sheet 50, escape from the spiral wound article 20 through a temporary channel created by the decomposing of sheet 20 and thus do not cause any delamination of the flexible graphite sheet in the spiral wound article 20. Also, the decomposition of the heat decomposable sheet into small, isolated particles of carbon enables the complete, co-extensive resin bonding of the spiral wound flexible graphite sheet as shown in FIG. 1(E).

The resulting shell is rigid, strong and resistant to corrosion, such as from highly reactive chemical gases, and the cured resin bonding does not significantly diminish the thermal properties of the spiral wound shell.

Figure 7:
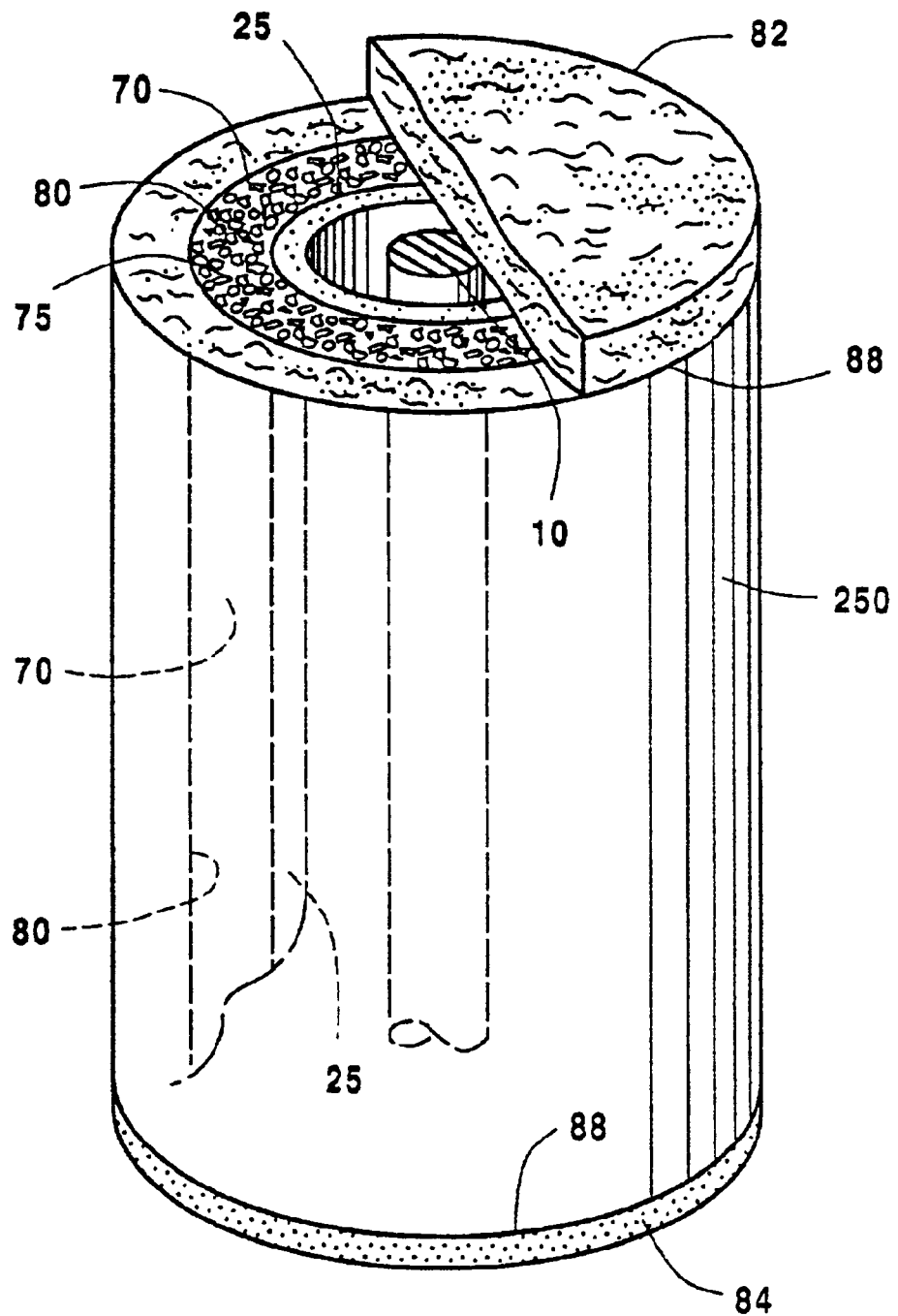
FIG. 7 shows a perspective view of a further embodiment of the present invention.

In a further embodiment of the present invention, illustrated in FIG. 7, a second spiral wound shell 250, identical to the shell 25, except for having a larger cross section, surrounds shell 25, forming an annular chamber 70 therebetween which is at least partially (and preferably wholly) filled with an insulating material, such as individual particles 75 of uncompressed expanded graphite. These uncompressed particles of expanded graphite receive thermal energy by conduction from the inner shell 25, which is diffused throughout annular chamber 70; any radiant energy from inner shell 25 is likewise diffused by the particles of expanded graphite 75 and reflected by the inner wall 80 of shell 250. The resulting article relatively uniformly reflects radiant thermal energy back to reactor 10 and maintains an even temperature profile despite surges in heat radiation from reactor 10 while being highly resistant to attack by corrosive gases due to being formed completely from solid carbon components. The top and bottom of annular chamber can be sealed by sheets of flexible graphite 82 and 84 that can be in the form of the same material as shells 25 and 250, being prepared in planar form in flat molds, and resin bonded, as indicated at 88.

In the practice of the present invention a suitable resin for use, such as a phenolic resin like PHYOPHEN 43703 Phenolic Resin in methanol solvent available from Occidental Chemical Corporation, North Tonawanda, N.Y. The resin is suitably cured by heating at 125° C. for 16 minutes and 300° C. for 16 hours. Kraft paper can be used as the heat decomposable, carbon based substrate 50. The substrate 50' can be a PAN carbon fiber tissue or pitch fiber tissue available from Technical Fibre Products Limited, Cumbria, England.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A process for preparing a thermal insulating device, the process comprising forming a shell capable of use as a heat shield surrounding a radiant heat source, by
   (i) forming an anisotropic flexible graphite sheet
   (ii) forming the graphite sheet into a shell comprising multiple layers of a continuous spiral wound graphite sheet, the layers of spiral wound graphite sheet being separated by a curable resin coated on both sides of a thin sheet of heat decomposable carbon based material co-extensive with said spiral wound sheet of flexible graphite; and
   (iii) curing the resin, thereby causing at least partial decomposition of the carbon based material and enabling contact between the resin on each side of the sheet of carbon based material.

2. The process of claim 1 wherein the resin comprises a heat-curable phenolic resin.

3. The process of claim 2 wherein the resin is cured by the application of heat, with decomposition of the carbon based material creating a channel for escape of gases which evolve from the curing of the resin.

* * * * *